United States Patent
Garcarz et al.

(10) Patent No.: US 11,677,661 B2
(45) Date of Patent: Jun. 13, 2023

(54) DETECTING A LACK OF CORRELATION BETWEEN APPLICATION QUALITY OF EXPERIENCE AND NETWORK CONDITIONS

(71) Applicant: Cisco Technology, Inc., San Jose, CA (US)

(72) Inventors: Michal Wladyslaw Garcarz, Cracow (PL); Jean-Philippe Vasseur, Saint Martin d'Uriage (FR); Vinay Kumar Kolar, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 147 days.

(21) Appl. No.: 17/368,131

(22) Filed: Jul. 6, 2021

(65) Prior Publication Data

US 2023/0009634 A1    Jan. 12, 2023

(51) Int. Cl.
| | |
|---|---|
| *H04L 45/302* | (2022.01) |
| *H04L 47/24* | (2022.01) |
| *H04L 45/02* | (2022.01) |
| *H04L 45/12* | (2022.01) |
| *H04L 45/00* | (2022.01) |

(52) U.S. Cl.
CPC ............ *H04L 45/302* (2013.01); *H04L 45/02* (2013.01); *H04L 45/08* (2013.01); *H04L 45/123* (2013.01); *H04L 45/22* (2013.01); *H04L 47/24* (2013.01)

(58) Field of Classification Search
CPC ....... H04L 45/302; H04L 45/02; H04L 45/08; H04L 45/123; H04L 45/22; H04L 47/24
See application file for complete search history.

(56) References Cited

U.S. PATENT DOCUMENTS

| | | |
|---|---|---|
| 10,454,989 B2 | 10/2019 | Ouyang et al. |
| 10,511,708 B2 | 12/2019 | Rangarajan et al. |
| 2016/0028608 A1* | 1/2016 | Dasgupta ................ H04L 43/16 370/252 |
| 2016/0065419 A1 | 3/2016 | Szilagyi et al. |
| 2019/0044830 A1* | 2/2019 | Kersch ................ H04L 41/5067 |
| 2020/0296023 A1* | 9/2020 | Kumar .................. H04L 43/103 |
| 2021/0168068 A1 | 6/2021 | Shenoy |

OTHER PUBLICATIONS

Yalagandula, et al., "Correlations in End-to-End Network Metrics: Impact on Large Scale Network Monitoring", IEEE INFOCOM Workshops 2008, Apr. 13-18, 2008, 6 pages, IEEE.

* cited by examiner

*Primary Examiner* — Pao Sinkantarakorn
*Assistant Examiner* — Kabir U Jahangir
(74) *Attorney, Agent, or Firm* — Behmke Innovation Group LLC; Kenneth J. Heywood; Jonathon P. Western

(57) ABSTRACT

In one embodiment, a device obtains quality of experience metrics for an online application. The device obtains network metrics for one or more network paths over which traffic for the online application was routed. The device identifies a lack of correlation between the quality of experience metrics for the online application and the network metrics for the one or more network paths over which traffic for the online application was routed. The device disables, based on the lack of correlation, explicit probing of the one or more network paths.

20 Claims, 10 Drawing Sheets

FIG. 6

Kendall's correlation:
+1 = Good correlation
0 = No correlation
-1 = Good anti-correlation

1.0 to 0.4
0.4 to -0.4
-0.4 to -1.0

Correlation matrix (USER EXPERIENCE SCORE 602 vs NETWORK METRICS 604):

| | roundtriptime | rxe2ejitter | rxhbhlostpercent | rxmediabitrate | rxrecoverypercent | rxtotalbitrate | txhbhjitter | txhbhlostpercent | txmediabitrate | txrecoverypercent | txtotalbitrate |
|---|---|---|---|---|---|---|---|---|---|---|---|
| rxconcealmentime | 0.1 | 0.2 | 0.7 | 0.5 | 0.2 | 0.3 | 0.2 | 0.1 | 0.1 | -0.0 | 0.1 | -0.0 |
| roundtriptime | | 0.2 | 0.1 | 0.2 | -0.1 | 0.2 | 0.0 | 0.4 | 0.2 | 0.1 | 0.2 | 0.1 |
| rxe2ejitter | | | 0.2 | 0.1 | 0.1 | 0.0 | 0.3 | 0.0 | -0.1 | 0.1 | -0.2 |
| rxe2elostpercent | | | | 0.6 | 0.1 | 0.4 | 0.2 | 0.1 | 0.1 | -0.0 | 0.1 | -0.0 |
| rxhbhlostpercent | | | | | 0.0 | 0.6 | 0.2 | 0.1 | 0.1 | 0.0 | 0.1 | -0.0 |
| rxmediabitrate | | | | | | 0.1 | -0.2 | -0.0 | -0.1 | -0.0 | -0.0 |
| rxrecoverypercent | | | | | | | 0.3 | -0.1 | 0.1 | 0.1 | 0.1 | 0.1 |
| rxtotalbitrate | | | | | | | | -0.2 | 0.0 | 0.1 | 0.0 | 0.2 |
| txhbhjitter | | | | | | | | | 0.1 | -0.2 | 0.0 | -0.3 |
| txhbhlostpercent | | | | | | | | | | 0.1 | 0.6 | 0.2 |
| txmediabitrate | | | | | | | | | | | 0.2 | 0.8 |
| txrecoverypercent | | | | | | | | | | | | 0.0 |

600

DETECTING A LACK OF CORRELATION BETWEEN APPLICATION QUALITY OF EXPERIENCE AND NETWORK CONDITIONS

TECHNICAL FIELD

The present disclosure relates generally to computer networks, and, more particularly, to detect a lack of correlation between application quality of experience (QoE) and network conditions.

BACKGROUND

Software-defined wide area networks (SD-WANs) represent the application of software-defined networking (SDN) principles to WAN connections, such as connections to cellular networks, the Internet, and Multiprotocol Label Switching (MPLS) networks. The power of SD-WAN is the ability to provide consistent service level agreement (SLA) for important application traffic transparently across various underlying tunnels of varying transport quality and allow for seamless tunnel selection based on tunnel performance characteristics that can match application SLAs and satisfy the quality of service (QoS) requirements of the traffic (e.g., in terms of delay, jitter, packet loss, etc.).

With the recent evolution of machine learning, predictive failure detection and proactive routing in an SDN/SD-WAN now becomes possible through the use of machine learning techniques. For instance, modeling the delay, jitter, packet loss, etc. for a network path can be used to predict when that path will violate the SLA of the application and reroute the traffic, in advance. However, experimentation has revealed that there are some applications whose quality of experience (QoE) (e.g., how a user perceives their experience with the application) is not significantly correlated with the network path metrics, meaning that the additional overhead associated with the predictive routing mechanism is unnecessary.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 6 illustrates an example correlation matrix for quality of experience (QoE) and network metrics.

DESCRIPTION OF EXAMPLE EMBODIMENTS

Overview

Figure 1A:
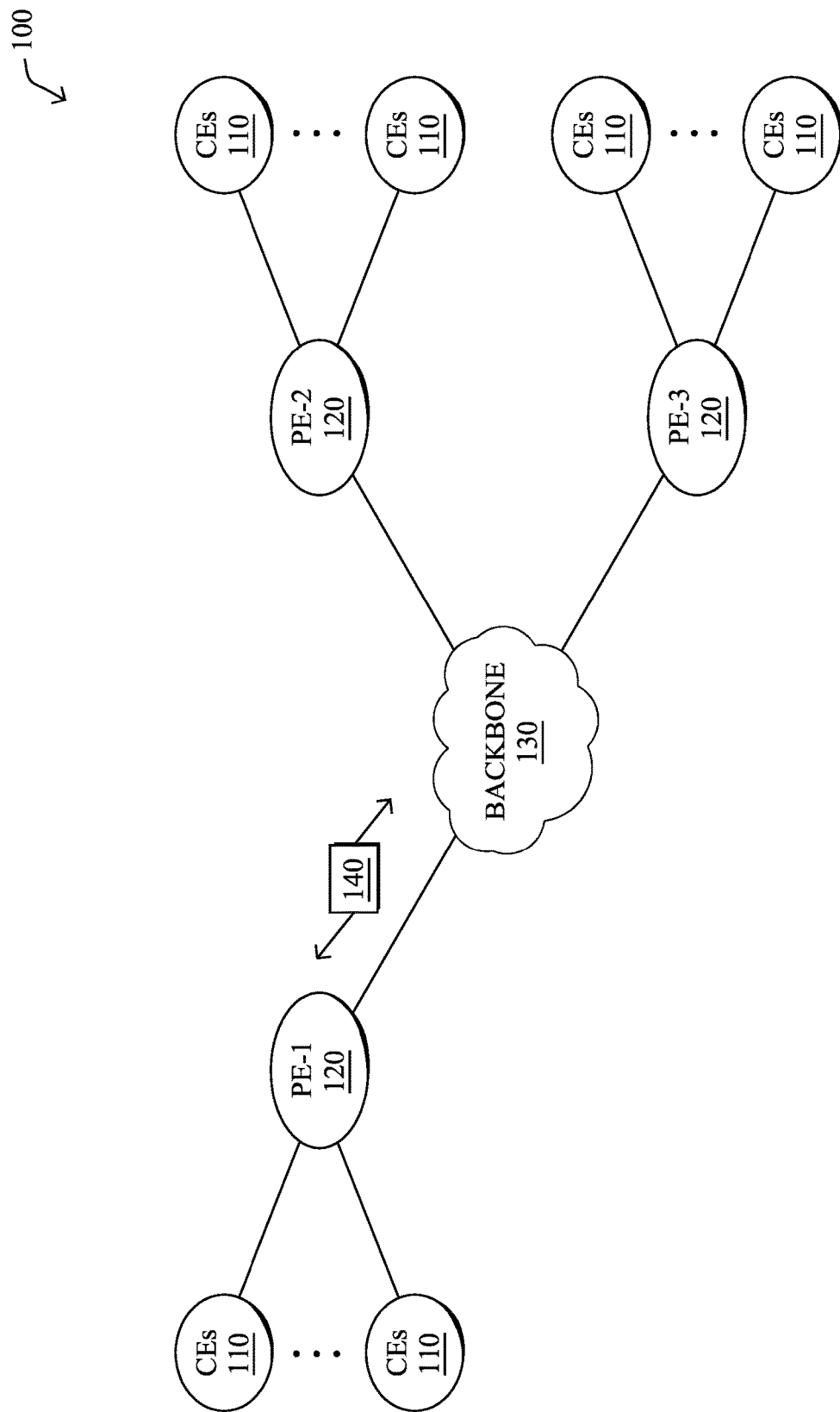
FIGS. 1A-1B illustrate an example communication network.

According to one or more embodiments of the disclosure, a device obtains quality of experience metrics for an online application. The device obtains network metrics for one or more network paths over which traffic for the online application was routed. The device identifies a lack of correlation between the quality of experience metrics for the online application and the network metrics for the one or more network paths over which traffic for the online application was routed. The device disables, based on the lack of correlation, explicit probing of the one or more network paths.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
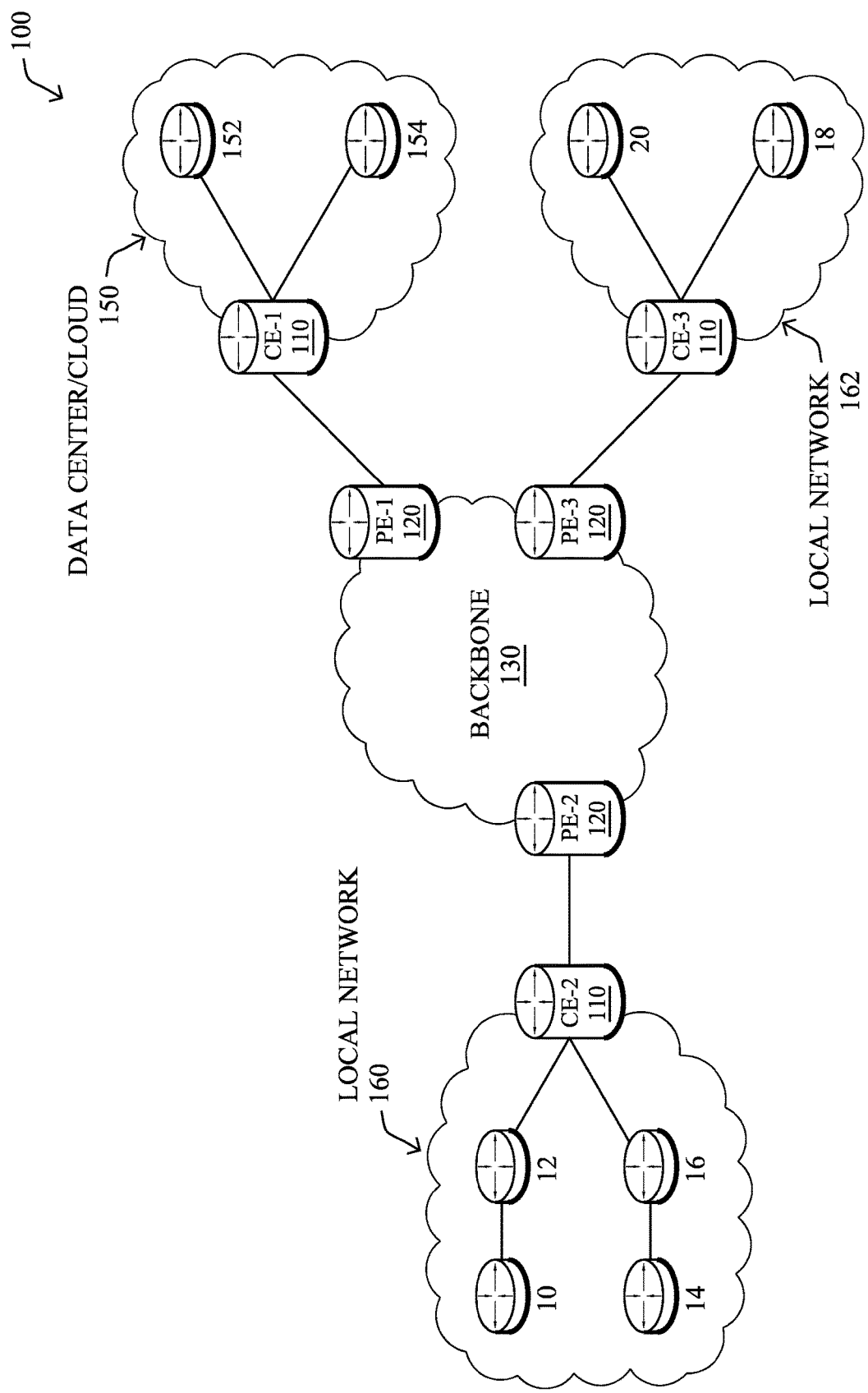

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
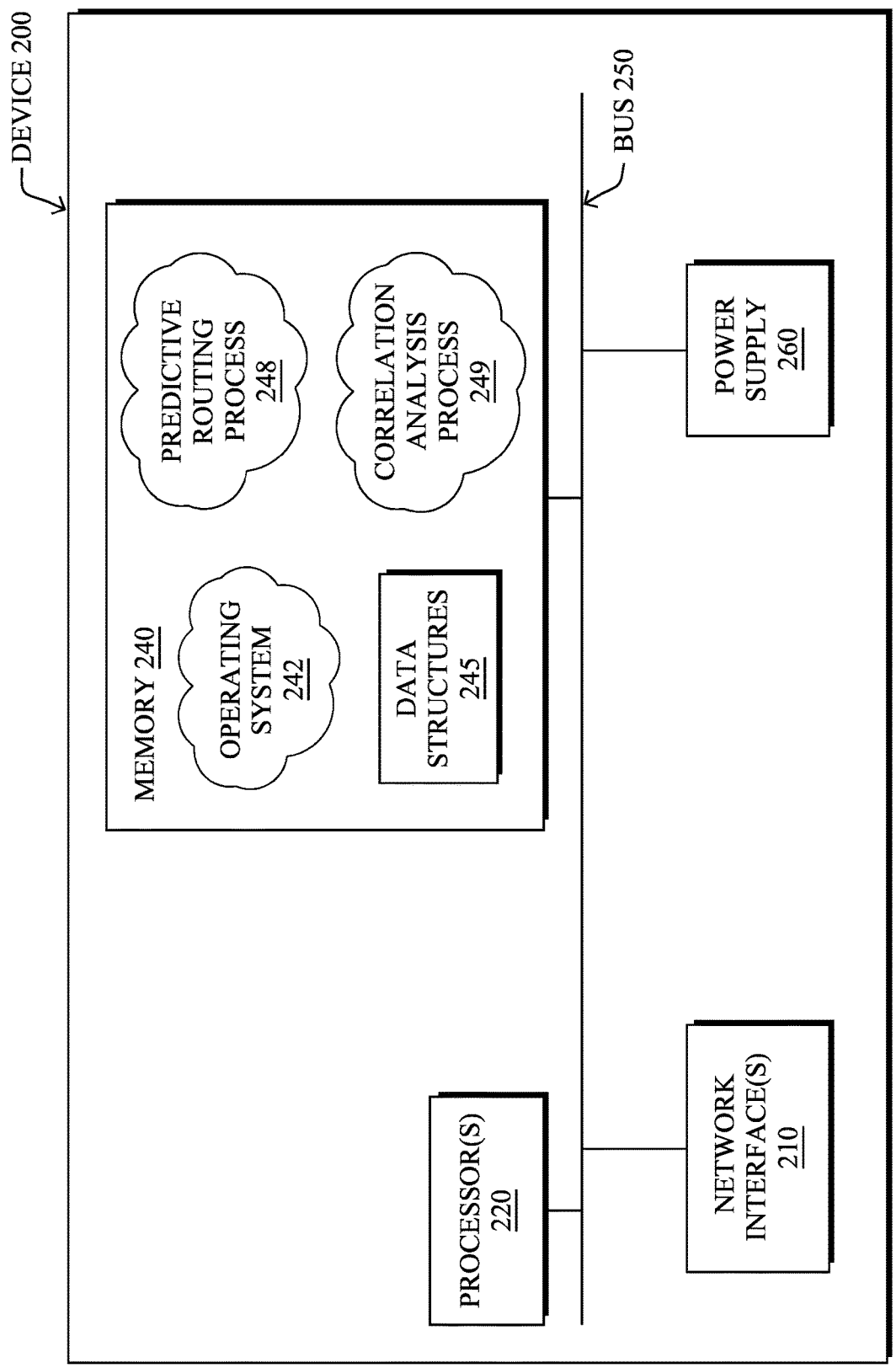
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a predictive routing process 248 and/or a correlation analysis process 249, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, predictive routing process 248 contains computer executable instructions executed by the processor 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

In various embodiments, as detailed further below, predictive routing process 248 and/or a correlation analysis process 249 may include computer executable instructions that, when executed by processor(s) 220, cause device 200 to perform the techniques described herein. To do so, in some embodiments, predictive routing process 248 and/or a correlation analysis process 249 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, predictive routing process 248 and/or a correlation analysis process 249 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that predictive routing process 248 and/or a correlation analysis process 249 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software as a service (SaaS) is having a dramatic impact of the overall Internet due to the extreme virtualization of services and shift of traffic load in many large enterprises. Consequently, a branch office or a campus can trigger massive loads on the network.

Figure 3A:
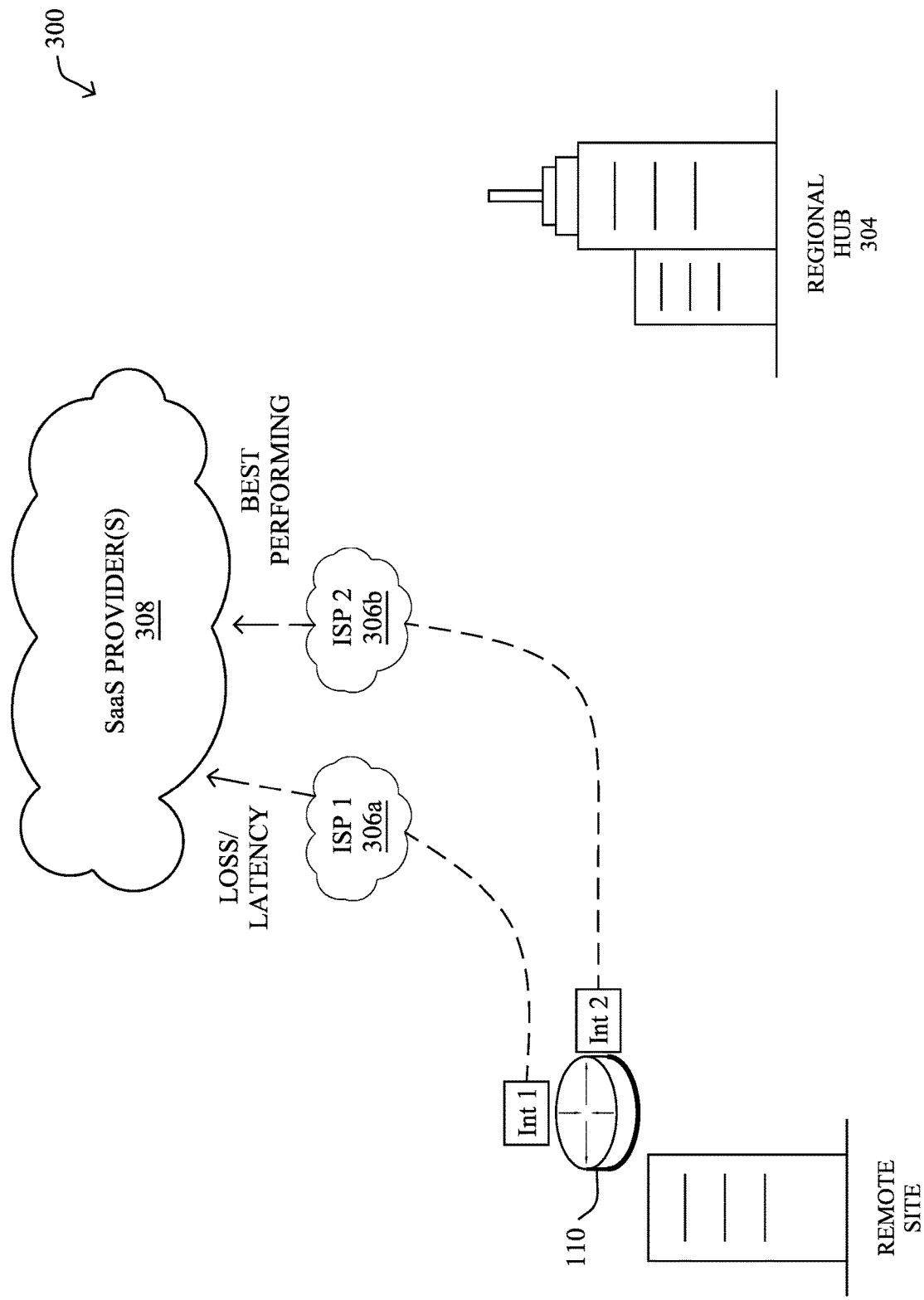
FIGS. 3A-3B illustrate example network deployments.
Figure 3B:
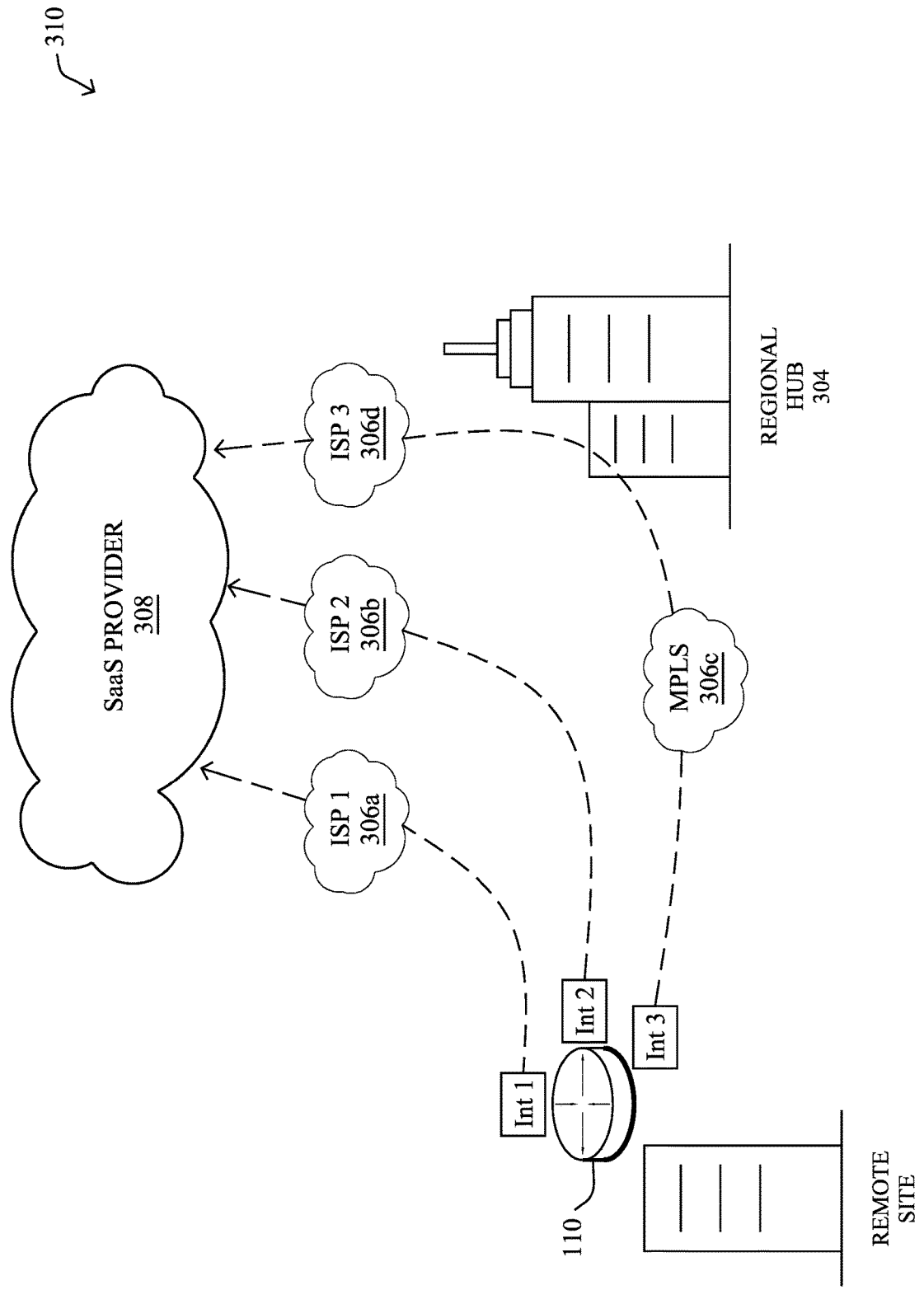

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider(s) 308 via another network, such as a third ISP 306d.

Regardless of the specific connectivity configuration for the network, a variety of access technologies may be used (e.g., ADSL, 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4A:
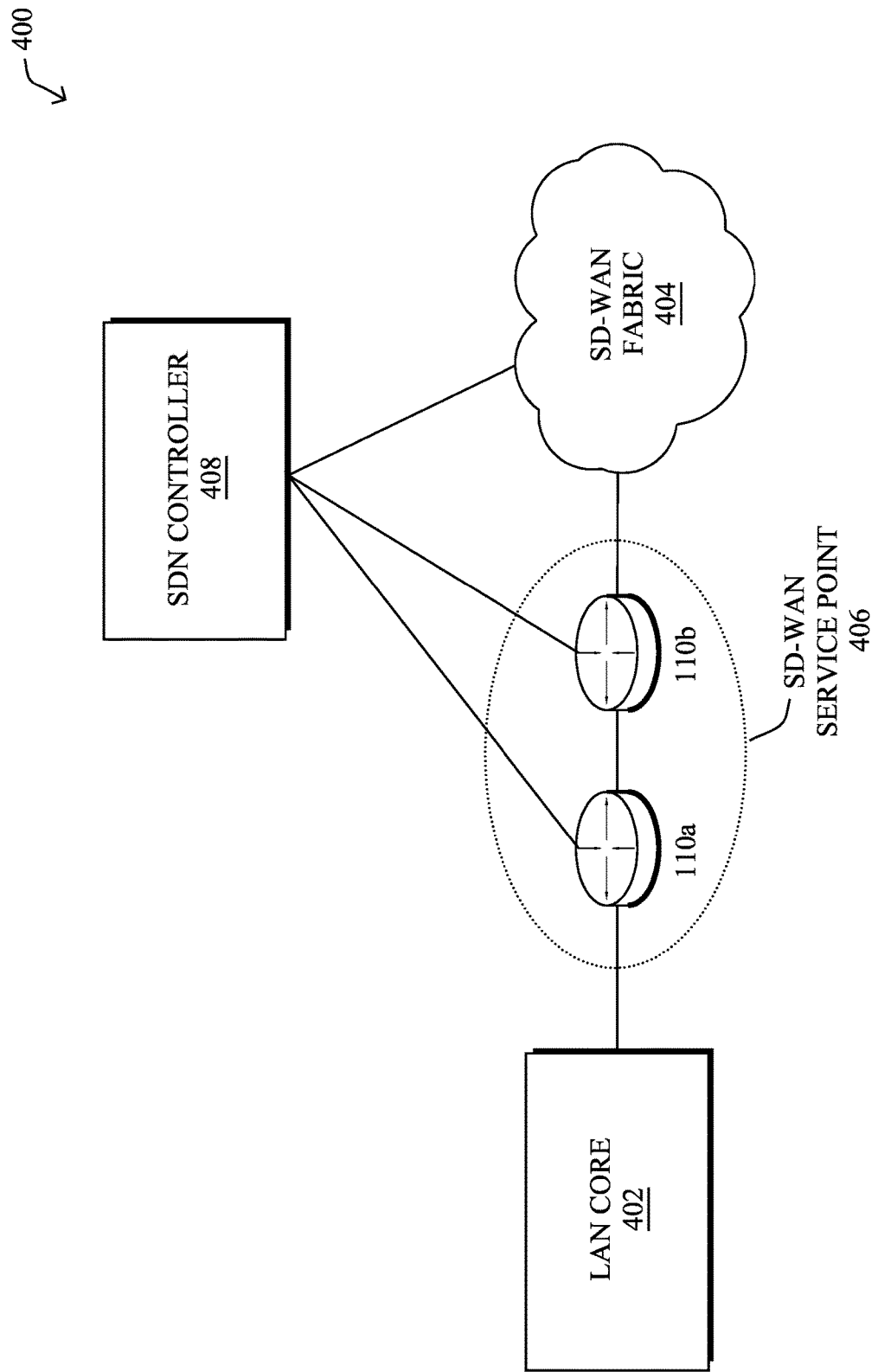
FIGS. 4A-4B illustrate example software defined network (SDN) implementations.

FIG. 4A illustrates an example SDN implementation 400, according to various embodiments. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., a device 200) configured to provide a supervisory service, typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/tunnels between LAN core 402 and remote destinations such as regional hub 304 and/or SaaS provider(s) 308 in FIGS. 3A-3B and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS, Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;
New SaaS applications being deployed everywhere in the network, hosted by a number of different cloud providers;
Internet, MPLS, LTE transports providing highly varying performance characteristics, across time and regions;
SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various embodiments, application aware routing usually refers to the ability to rout traffic so as to satisfy the requirements of the application, as opposed to exclusively relying on the (constrained) shortest path to reach a destination IP address. Various attempts have been made to extend the notion of routing, CSPF, link state routing protocols (ISIS, OSPE, etc.) using various metrics (e.g., Multi-topology Routing) where each metric would reflect a different path attribute (e.g., delay, loss, latency, etc.), but each time with a static metric. At best, current approaches rely on SLA templates specifying the application requirements so as for a given path (e.g., a tunnel) to be "eligible" to carry traffic for the application. In turn, application SLAs are checked using regular probing. Other solutions compute a metric reflecting a particular network characteristic (e.g., delay, throughput, etc.) and then selecting the supposed 'best path,' according to the metric.

The term 'SLA failure' refers to a situation in which the SLA for a given application, often expressed as a function of delay, loss, or jitter, is not satisfied by the current network path for the traffic of a given application. This leads to poor QoE from the standpoint of the users of the application. Modern SaaS solutions like Viptela, CloudonRamp SaaS, and the like, allow for the computation of per application QoE by sending HyperText Transfer Protocol (IMP) probes along various paths from a branch office and then route the application's traffic along a path having the best QoE for the application. At a first sight, such an approach may solve many problems. Unfortunately, though, there are several shortcomings to this approach:

- The SLA for the application is 'guessed,' using static thresholds.
- Routing is still entirely reactive: decisions are made using probes that reflect the status of a path at a given time, in contrast with the notion of an informed decision.
- SLA failures are very common in the Internet and a good proportion of them could be avoided (e.g., using an alternate path), if predicted in advance.

Figure 4B:
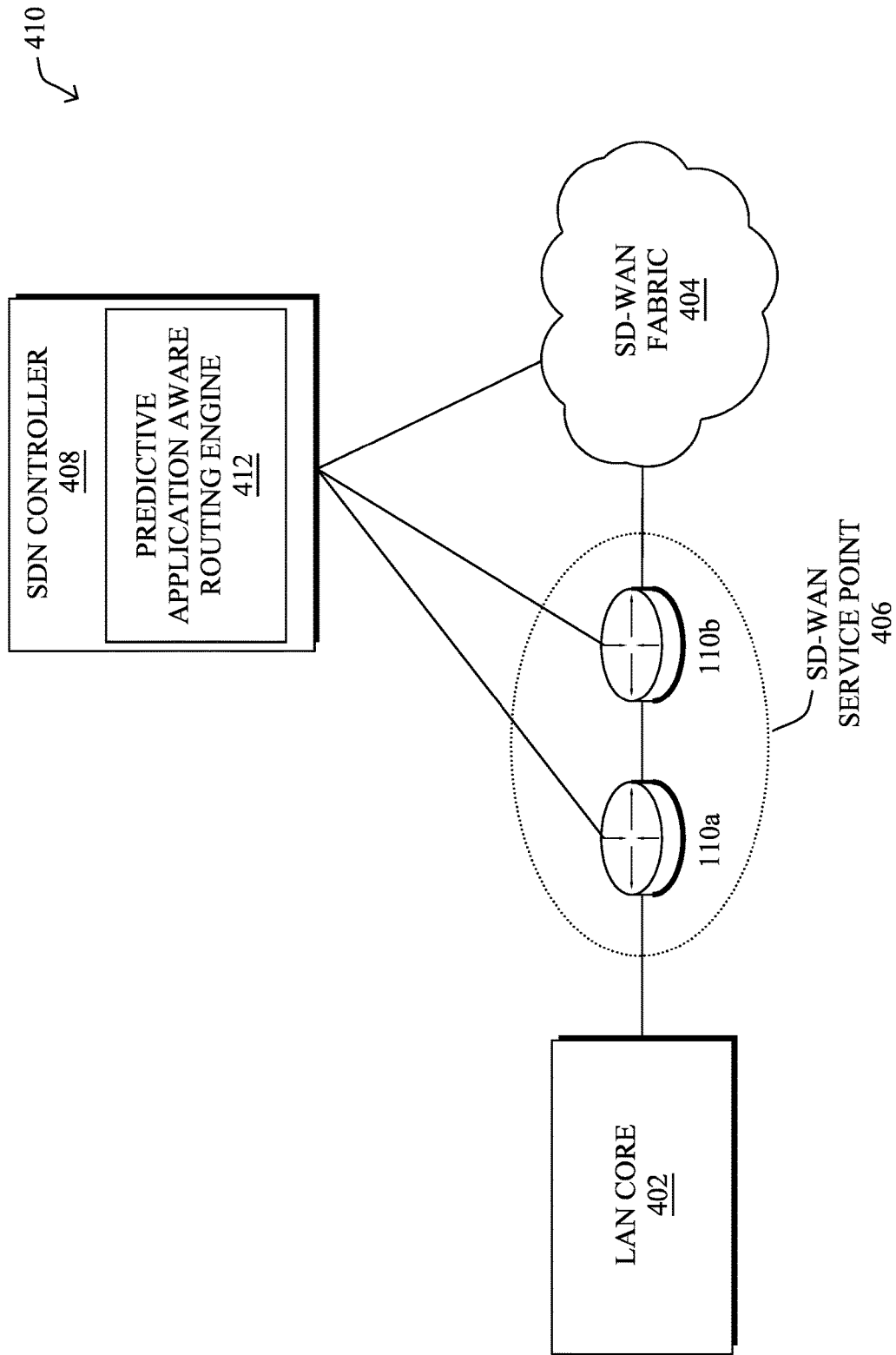

In various embodiments, the techniques herein allow for a predictive application aware routing engine to be deployed, such as in the cloud, to control routing decisions in a network. For instance, the predictive application aware routing engine may be implemented as part of an SDN controller (e.g., SDN controller 408) or other supervisory service, or may operate in conjunction therewith. For instance, FIG. 4B illustrates an example 410 in which SDN controller 408 includes a predictive application aware routing engine 412 (e.g., through execution of predictive routing process 248). Further embodiments provide for predictive application aware routing engine 412 to be hosted on a router 110 or at any other location in the network.

During execution, predictive application aware routing engine 412 makes use of a high volume of network and application telemetry (e.g., from routers 110a-110b, SD-WAN fabric 404, etc.) so as to compute statistical and/or machine learning models to control the network with the objective of optimizing the application experience and reducing potential down times. To that end, predictive application aware routing engine 412 may compute a variety of models to understand application requirements, and predictably route traffic over private networks and/or the Internet, thus optimizing the application experience while drastically reducing SLA failures and downtimes.

In other words, predictive application aware routing engine 412 may first predict SLA violations in the network that could affect the QoE of an application (e.g., due to spikes of packet loss or delay, sudden decreases in bandwidth, etc.). In turn, predictive application aware routing engine 412 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one embodiment. In general, routing configuration changes are also referred to herein as routing "patches," which are typically temporary in nature (e.g., active for a specified period of time) and may also be application-specific (e.g., for traffic of one or more specified applications).

As noted above, predictive routing mechanisms, such as predictive application aware routing engine 412, seek to ensure the QoE of online applications by avoiding predicted SLA violations. The assumption is that the network itself causes application performance issues. For instance, classical voice codecs indeed were similar and had well defined network requirements. As an example: g729a requires up to 300 ms of round trip delay, 50 ms of jitter and ~2-3% of packet loss.

With the emergence of SaaS applications that are designed to highly tolerant to the fast changing network conditions, some applications are no longer so dependent on the network conditions. For example, Cisco Webex uses opus codec for voice, which is extremely resilient and capable sometimes of delivering quality, even at packet losses of approximately 50%. This is a sharp contrast with that of g729a.

As a result, there are the following types of [SaaS] applications:

1. Those, like Webex, which tend to be resilient to degraded network conditions. These types of applications deliver satisfying user QoE even under poor networking conditions. Significant fraction of Webex session with poor user QOE is not caused by network conditions, but suboptimal selection of media server, datacenter or application/endpoint issues.
2. Other applications, such as Citrix Workspace, which are extremely prone to degraded network conditions. Those applications still require very good networking conditions in order to deliver good QOE. Significant fraction of Citrix sessions with poor QOE is caused by poor networking conditions.

As a result of the above, for applications from the first group, it does not make much sense to use SLA templates based on networking conditions and such an approach could even be highly detrimental to the QoE, of the application.

Detecting a Lack of Correlation Between Application QoE and Network Conditions The techniques herein introduce mechanisms to identify a lack of correlation between application user experience (QoE) and path characteristics. Upon detecting such a lack of correlation between a set of path metrics and applications QOE, the system may explicitly deactivate the use of network probing. In some aspects, the system may also deactivate any kind of application aware routing approach based on network conditions for such applications along such paths, thus avoiding unnecessary probing and needlessly rerouting application traffic with no real effect on the QoE.

Illustratively, the techniques described herein may be performed by hardware, software, and/or firmware, such as in accordance with correlation analysis process 249, which may include computer executable instructions executed by the processor 220 (or independent processor of interfaces 210) to perform functions relating to the techniques described herein, in conjunction with predictive routing process 248.

Specifically, according to various embodiments, a device obtains quality of experience metrics for an online application. The device obtains network metrics for one or more network paths over which traffic for the online application was routed. The device identifies a lack of correlation between the quality of experience metrics for the online application and the network metrics for the one or more network paths over which traffic for the online application was routed. The device disables, based on the lack of correlation, explicit probing of the one or more network paths.

Operationally, the techniques herein propose a system and methods for finding applications for which user QoE does not strongly depend on networking conditions. The proposed system then utilizes statistical and machine learning models to use application labels/feedback to optimize routing for those applications (instead of networking metrics). This allows for the automatic identification and routing of applications which are sensitive too application feedback or network SLA (or both).

Figure 5:
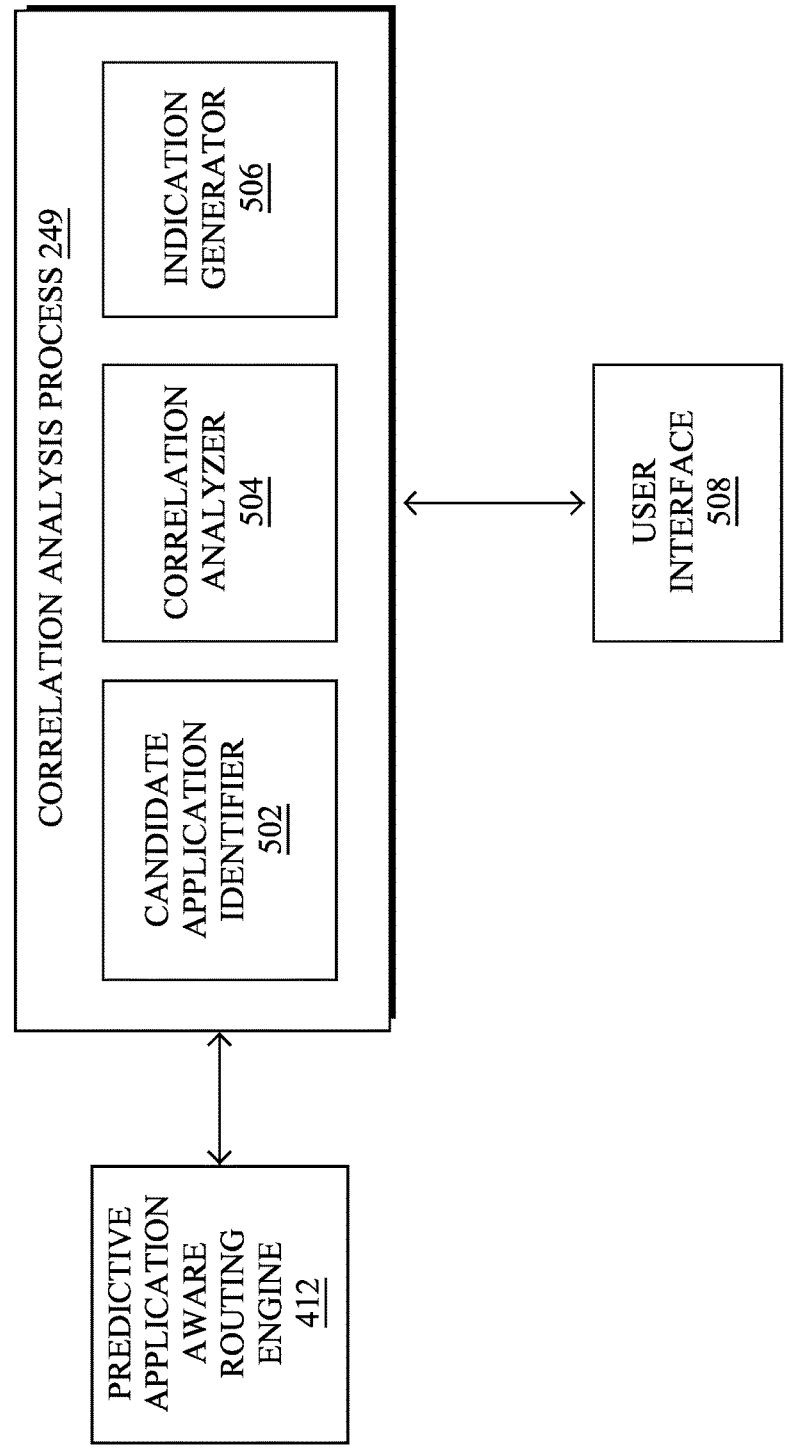
FIG. 5 illustrates an example architecture for a correlation analysis process.

FIG. 5 illustrates an example architecture 500 for a correlation analysis process, according to various embodiments. At the core of architecture 500 is correlation analysis process 249, which may be executed by a controller for a network or another device in communication therewith. For instance, correlation analysis process 249 may be executed by a controller for a network (e.g., SDN controller 408 in FIGS. 4A-4B), a particular networking device in the network (e.g., a router, etc.), another device or service in communication therewith, or the like, to provide a supervisory service to the network. More specifically, correlation analysis process 249 may operate in conjunction with a predictive application aware routing engine, such as predictive application aware routing engine 412, or directly implemented as a component thereof.

As shown, correlation analysis process 249 may include any or all of the following components: a candidate application identifier 502, a correlation analyzer 504, and/or an indication generator 506. As would be appreciated, the functionalities of these components may be combined or omitted, as desired. In addition, these components may be implemented on a singular device or in a distributed manner, in which case the combination of executing devices can be viewed as their own singular device for purposes of executing correlation analysis process 249.

As stated previously, relying on a network-centric probing approach to improve the QoE of SaaS applications that are tolerant to network issues can be detrimental for the following reasons:
  Doing so adds extra-overhead, due to the probing traffic.
  Even more importantly, networking issues (e.g., higher jitter, packet drops, . . . ) may lead to change of routing decisions, increasing stress on the network, traffic disruption (due to rerouting) without any effect, and can even lead to some network instabilities.

Candidate application identifier 502 is used to specify the set of applications and path(s) of interest for analysis by correlation analysis process 249. Indeed, being able to detect whether the state of a network path and application QoE are correlated can be quite useful in a predictive routing system. For example, the use of fast probes for assessing path states may be expensive for some types of links. As of today, one can observe that links such as LTE are more and more common but one of the main challenges is that probing traffic over such links is highly undesirable. Moreover, application feedback regarding the QoE is not always available. Candidate application identifier 502 allows a network operator to assess a specified set of applications and/or links that correlation analysis process 249 should assess. Generally speaking, the objective of candidate application identifier 502 is to maintain:
  The set of applications to which the correlation analysis should be applied
  The set of paths/path types to which the correlation analysis should be applied For example, a user may specify via user interface 508 that only the voice traffic from O365 (Teams) over LTE links should benefit from the correlation analysis system. Doing so would allow for the potential detection O365 Teams traffic over an LTE link that is not actually correlated with the application mean opinion score (MoS) (e.g., its QoE) and networking probing should NOT be used for application routing.

According to various embodiments, correlation analyzer 504 may be configured to determine whether the application QorE metrics and network metrics are correlated or uncorrelated for any given application. Thus, correlation analyzer 504 may obtain the QoE metrics and associated network metrics for the network path(s) over which the traffic for the specified application is routed. In some instances, the QoE metrics may be explicitly provided by users of the application itself. For instance, users of the application may be asked to provide an experience rating on a defined scale (e.g., 0-5 stars, on a scale of 1-10, etc.) In other cases, the QoE metrics may be obtained, automatically, such as a concealment time value.

In one embodiment, correlation analyzer 504 use the QoE metrics and network path metrics to compute a correlation matrix. Doing so allows correlation analyzer 504 to determine the positive or negative correlations of the network state conditions (using network centric probes) and the reported application QoE. Such a matrix will compute the correlation between applications states reflecting the QoE (e.g., a MoS score) and the related path states (e.g. high latency, high loss, etc.).

More specifically, correlation analyzer 504 may identify the application sessions over each path (e.g., using NetFlow records, etc.). Then, correlation analyzer 504 may determine the dependence of the application experience, such as MOS for voice, on other network parameters such as loss, latency, jitter, etc. Various correlation techniques could be used, such as by computing a Pearson's correlation coefficient, Kendall correlation coefficient, or the like.

FIG. 6 illustrates an example correlation matrix 600 for quality of experience (QoE) and network metrics. As shown, correlation matrix 600 was computed for a user experience score 602, rxconcealmenttime, and for the following network metrics:
  roundtriptime—the round trip time for the path
  rxe2ejitter—the received end-to-end jitter
  rxe2elostpercent—the received end-to-end percentage of lost packets rxmediabitrate—the received media bitrate
rxrecoverypercent—the received recovery percentage
rxtotalbitrate—the received total bitrate
txhbhjitter—the transmit hop-by-hop jitter
txhbhlostpercent—the transmit hop-by-hop percentage of lost packets
txmediabitrate—the transmit media bitrate
txrecoverypercent—the transmit recovery percentage
txtotalbitrate—the transmit total bitrate Here, the concealment time is used as a proxy for the application QoE and correlation coefficients were computed between it and the various network metrics 604 shown. From correlation matrix 600, it can be seen that user experience score 602 has a high positive correlation with loss, but not with other networking parameters such as jitter and latency. Hence, making predictive routing decisions based on an SLA dependent on loss, latency, and jitter would not have much of an effect on the overall QoE. In such a situation, it may be more beneficial to instead make routing decisions based on the QoE score itself and to disable the active probing of the traffic path(s).

Referring again to FIG. 5, in another embodiment, correlation analyzer 504 may infer the correlation (or non-correlation) of QoE with network metrics, only if it is consistently established across different user sessions, networks, and geographic locations. For example, correlation analyzer 504 may decide to categorize the application as SLA non-dependent if it is not strongly correlated to loss, latency, and jitter across a wide range of user sessions. This can also be done on a per service provider (SP), geographic location, etc., basis.

Indication generator 506 is generally configured to provide an indication as to the correlation or lack of correlation between the application QoE and network metrics, such as to predictive application aware routing engine 412 and/or user interface 508. To do so, indication generator 506 may compare the correlation coefficients computed by correlation analyzer 504 to one or more thresholds, to determine whether a lack of correlation exists. In such a case, indication generator 506 may provide an indication to user interface 508, so that the network operator can gain insight into the behavior of the application and the network. Note also that any reported correlations or lack thereof may be global, regional, or even specific to a certain network deployment. For instance:

Deployment 1 is using O365 PowerPoint application and working mostly on big presentations, such as by attaching and playing video movies. For such a network deployment, the correlation matrix between networking metrics (loss, jitter, latency, etc.) and the QoE metrics may be very different then for the other network deployments using the same O365 PowerPoint application with very small presentations consists mostly of text.

Different regions may use the Salesforce SaaS application very differently. As a result, the correlation matrix for South America might be different then the correlation matrix for Europe, for the same SaaS application.

Accordingly, indication generator 506 may take all of these dimensions into consideration when generating its output.

In further embodiments, another objective of correlation analyzer 504 is also keep monitoring routing patch and applications changes, making the correlation computations an ongoing process. Indeed, a path that may have not been correlated with the application QoE may change at any time because of routing changes, thereby resulting in correlation changes. For example, a path may now traverse an autonomous system with network issues severally affecting the correlation between path characteristics and application QOE scores. In one embodiment, the path characteristics will be monitored using BGP routing tables. Upon detecting a change of traversed autonomous systems, correlation analyzer 504 may recompute the correlation coefficients.

In another embodiment, the path characteristics may be monitored using some an anomaly detector or using change point detection. Upon detecting a significant change of the path metrics, such as those due to a massive reroute of the application traffic or due to a failure, then correlation analyzer 504 may recompute its correlation coefficients, to see whether there has been a change in correlation that resulted.

One of challenges with SaaS applications is that their locations are typically cloud-based and dynamic across different network locations. Thus, being able to detect when an application is moving, such as through analysis of the corresponding Domain Name System (DNS) information, is critical to ensure that the correlation computations by correlation analyzer 504 remain up to date. For instance, if the DNS information for an SaaS application indicates a change in destinations, correlation analyzer 504 may enter a new monitoring phase for a period of time (potentially user configurable) in order to re-assess the correlation between the path metrics for the new path(s) and the QoE score for the application.

Finally, in the case in which indication generator 506 determines that, there is a lack of correlation between the application QoE and network path metrics, it may provide an indication to predictive application aware routing engine 412 (or the SDN controller, in general). In turn, the indication may do either or both of the following:

Deactivate all explicit probing along the path(s) where there is no correlation detected.

Deactivate the use of all probe-based predictive routing, where path selection is triggered by network centric probes.

Either or both of the above actions can also be triggered for a certain amount of time T, which can be statically configured or dynamically configured by the system using historical data. After the expiration of time T, correlation analyzer 504 may re-assess the correlation for the affected path(s) in the network.

Figure 7:
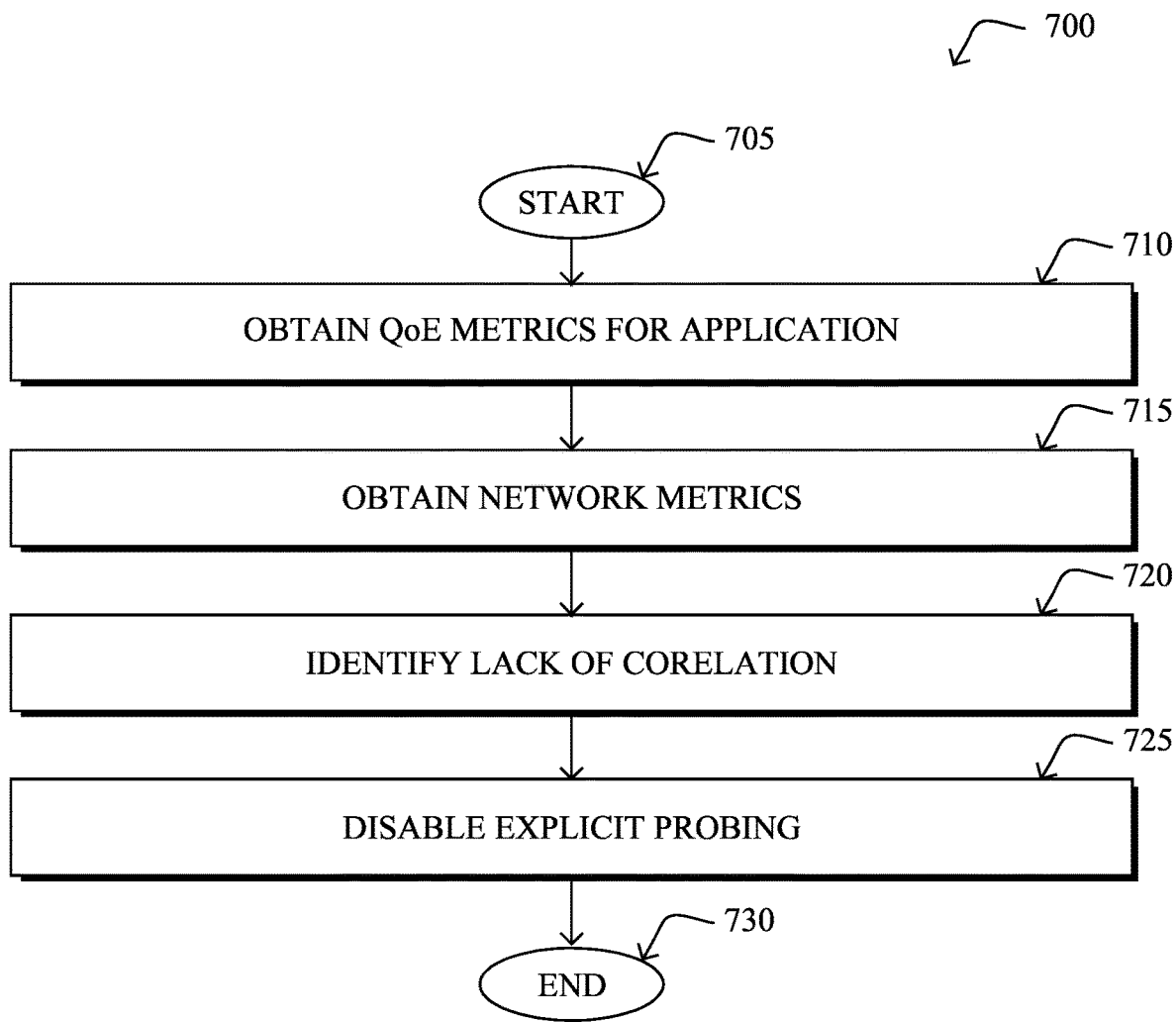
FIG. 7 illustrates an example simplified procedure for detecting a lack of correlation between application QoE and network conditions.

FIG. 7 illustrates an example simplified procedure 700 (e.g., a method) procedure for detecting a lack of correlation between application QoE and network conditions, in accordance with one or more embodiments described herein. For example, a non-generic, specifically configured device (e.g., device 200), such as controller for a network (e.g., an SDN controller or other device in communication therewith), may perform procedure 700 by executing stored instructions (e.g., correlation analysis process 249), to provide a supervisory service to a network. The procedure 700 may start at step 705, and continues to step 710, where, as described in greater detail above, the device may obtain quality of experience (QoE) metrics for an online application (e.g., an SaaS application, etc.). In some instances, the QoE metrics may be specified by users of the application itself, such as satisfaction scores, survey results, or the like. In other embodiments, the QoE metrics may be any metrics indicative of how the application performs from the standpoint of a user (e.g., concealment time, etc.).

At step 715, as detailed above, the device may also obtain network metrics for one or more paths over which traffic for the online application was routed. In various embodiments, such metrics may include a round trip time for the traffic, an amount of jitter for the traffic, a loss percentage for the traffic, a bitrate for the traffic, a recovery percentage for the traffic, combination thereof or the like. In further instances, the network metrics may be made on an end-to-end basis for a path, on a hop-by-hop basis, etc.

At step 720, the device may identify a lack of correlation between the quality of experience metrics for the online application and the network metrics for the one or more network paths over which traffic for the online application was routed, as described in greater detail above. In some embodiments, this may entail the device computing one or more correlation scores (e.g., Kendall's correlations, Pearson's correlations, etc.) between the QoE and network metrics, then determining whether any of them exceed a predefined threshold (e.g., a threshold that distinguishes between 'correlated' and a lack of correlation)

At step 725, as detailed above, the device may disable, based on the lack of correlation, deactivate explicit probing of the path(s). In various embodiments, such probing may be used as inputs for a predictive routing engine. In further embodiments, the device may also deactivate use of the predictive routing engine from making routing decisions for the traffic for the online application. In other words, if the path metrics do not have a significant impact on the application QoE, the device may deactivate any proactive mechanisms that typically rely on network metrics to trigger reroutes or other corrective measures. Of course, if the device detects that the traffic for the application has moved to one or more other paths, it may repeat any or all of the above steps. For instance, the device may analyze DNS information associated with the online application, to identify movement of the traffic to one or more other paths. Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, look to a lack of correlation between QoE and network metrics, to control the application of explicit probing and predictive routing mechanisms to certain network traffic. Indeed, while it is often presumed that SLA violations serve as a good proxy for application QoE, this is not always the case. Thus, predictive routing may not have an expected effect on the traffic and, in some instances, can even cause more harm than good (e.g., when needlessly rerouting traffic).

While there have been shown and described illustrative embodiments that provide for the identification of applications that lack a correlation between their QoE and the performance of the network, it is to be understood that various other adaptations and modifications may be made within the spirit and scope of the embodiments herein. For example, while certain embodiments are described herein with respect to using certain models for purposes of predicting application experience metrics, SLA violations, or other disruptions in a network, the models are not limited as such and may be used for other types of predictions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
   obtaining, by a device, quality of experience metrics for an online application;
   obtaining, by the device, network metrics for one or more network paths over which traffic for the online application was routed;
   identifying, by the device, a lack of correlation between the quality of experience metrics for the online application and the network metrics for the one or more network paths over which traffic for the online application was routed; and
   disabling, by the device and based on the lack of correlation, explicit probing of the one or more network paths.

2. The method as in claim 1, wherein the one or more network paths are part of a software defined wide area network (SD-WAN).

3. The method as in claim 1, further comprising:
   deactivating, by the device, a predictive routing engine from making routing decisions for the traffic for the online application, wherein the predictive routing engine uses as input results of the explicit probing of the one or more network paths.

4. The method as in claim 3, wherein the predictive routing engine uses machine learning to predict service level agreement (SLA) violations for the online application by the one or more network paths.

5. The method as in claim 1, further comprising:
   determining whether the quality of experience metrics for the online application are correlated with network metrics for one or more new paths to which the traffic for the online application has been moved.

6. The method as in claim 5, further comprising:
   identifying movement of the online application to a new address, using Domain Name System (DNS) information associated with the online application.

7. The method as in claim 1, wherein identifying the lack of correlation comprises:
   computing one or more correlation scores between the quality of experience metrics and the network metrics; and
   determining whether the one or more correlation scores exceed a predefined threshold.

8. The method as in claim 1, wherein the network metrics comprise at least one of: a round trip time for the traffic, an amount of jitter for the traffic, a loss percentage for the traffic, a bitrate for the traffic, or a recovery percentage for the traffic.

9. The method as in claim 1, further comprising:
   providing an indication of the lack of correlation to a user interface.

10. The method as in claim 1, wherein the device identifies the lack of correlation based on a request to assess a behavior of the online application or the one or more network paths.

11. An apparatus, comprising:
one or more network interfaces;
a processor coupled to the one or more network interfaces and configured to execute one or more processes; and
a memory configured to store a process that is executable by the processor, the process when executed configured to:
   obtain quality of experience metrics for an online application;
   obtain network metrics for one or more network paths over which traffic for the online application was routed;
   identify a lack of correlation between the quality of experience metrics for the online application and the network metrics for the one or more network paths over which traffic for the online application was routed; and
   disable, based on the lack of correlation, explicit probing of the one or more network paths.

12. The apparatus as in claim 11, wherein the one or more network paths are part of a software defined wide area network (SD-WAN).

13. The apparatus as in claim 11, wherein the process when executed is further configured to:
   deactivate a predictive routing engine from making routing decisions for the traffic for the online application, wherein the predictive routing engine uses as input results of the explicit probing of the one or more network paths.

14. The apparatus as in claim 13, wherein the predictive routing engine uses machine learning to predict service level agreement (SLA) violations for the online application by the one or more network paths.

15. The apparatus as in claim 11, wherein the process when executed is further configured to:
   determine whether the quality of experience metrics for the online application are correlated with network metrics for one or more new paths to which the traffic for the online application has been moved.

16. The apparatus as in claim 15, wherein the process when executed is further configured to:
   identify movement of the online application to a new address, using Domain Name System (DNS) information associated with the online application.

17. The apparatus as in claim 11, wherein the apparatus identifies the lack of correlation by:
   computing one or more correlation scores between the quality of experience metrics and the network metrics; and
   determining whether the one or more correlation scores exceed a predefined threshold.

18. The apparatus as in claim 11, wherein the network metrics comprise at least one of: a round trip time for the traffic, an amount of jitter for the traffic, a loss percentage for the traffic, a bitrate for the traffic, or a recovery percentage for the traffic.

19. The apparatus as in claim 11, wherein the process when executed is further configured to:
   provide an indication of the lack of correlation to a user interface.

20. A tangible, non-transitory, computer-readable medium storing program instructions that cause a device to execute a process comprising:
   obtaining, by the device, quality of experience metrics for an online application;
   obtaining, by the device, network metrics for one or more network paths over which traffic for the online application was routed;
   identifying, by the device, a lack of correlation between the quality of experience metrics for the online application and the network metrics for the one or more network paths over which traffic for the online application was routed; and
   disabling, by the device and based on the lack of correlation, explicit probing of the one or more network paths.

* * * * *

UNITED STATES PATENT AND TRADEMARK OFFICE
CERTIFICATE OF CORRECTION

PATENT NO. : 11,677,661 B2
APPLICATION NO. : 17/368131
DATED : June 13, 2023
INVENTOR(S) : Michal Wladyslaw Garcarz et al.

It is certified that error appears in the above-identified patent and that said Letters Patent is hereby corrected as shown below:

In the Specification

Column 3, Line 42, please amend as shown:
may be connected to network 100 via PE-3 and via a separate Column 9, Line 29, please amend as shown:
QoE by sending HyperText Transfer Protocol (HTTP) probes Column 12, Line 31, please amend as shown:
QoE metrics and network metrics are correlated or uncor- Column 12, Line 39, please amend as shown:
scale (e.g., 0-5 stars, on a scale of 1-10, etc.). In other cases, the Column 13, Line 63, please amend as shown:
analyzer 504 is also to keep monitoring routing patch and Signed and Sealed this
Twelfth Day of September, 2023

Katherine Kelly Vidal
*Director of the United States Patent and Trademark Office*